UNITED STATES PATENT OFFICE.

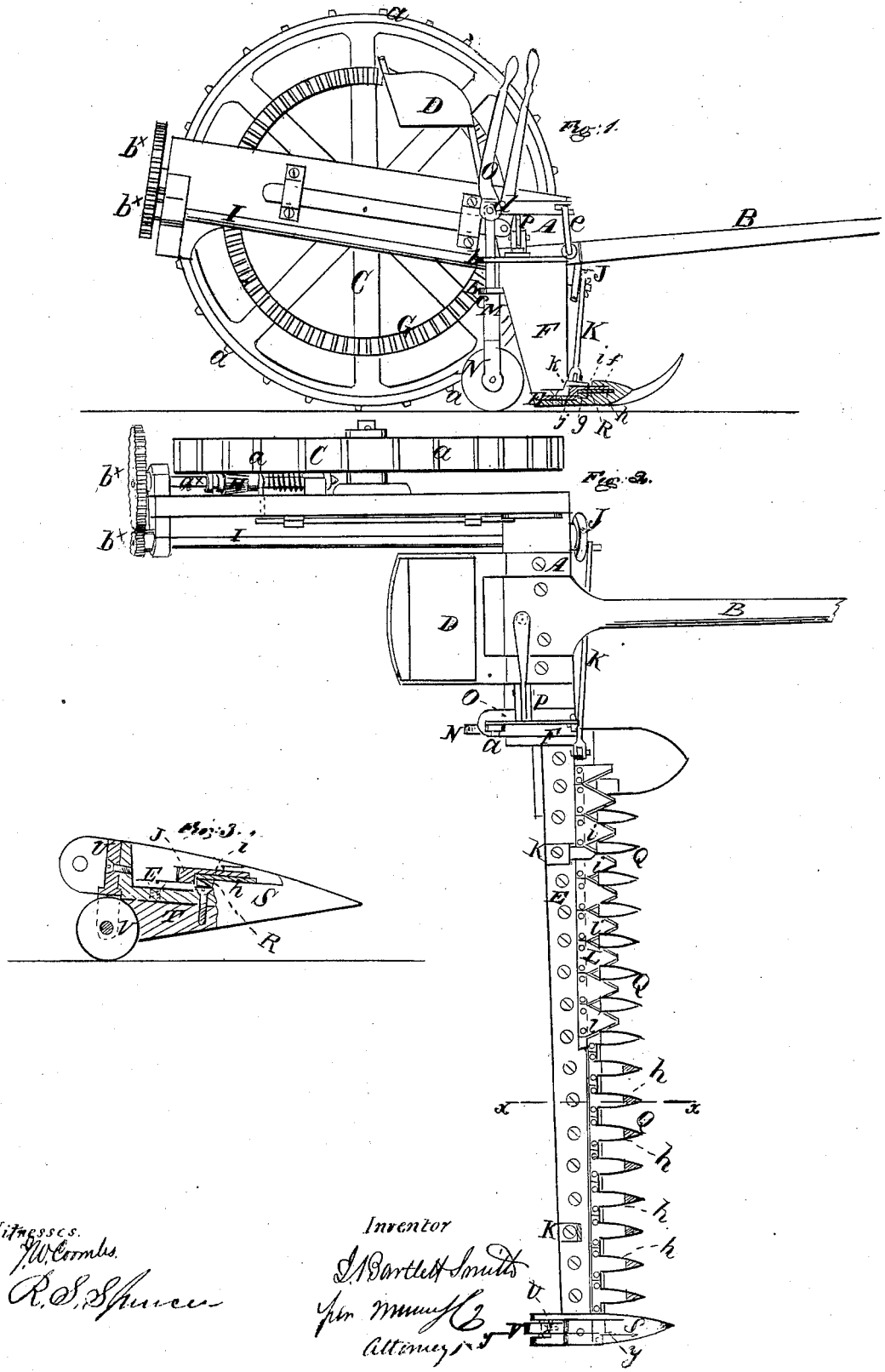

J. BARTLETT SMITH, OF WINFIELD, NEW YORK.

IMPROVEMENT IN HARVESTERS.

Specification forming part of Letters Patent No. 31,486, dated February 19, 1861.

*To all whom it may concern:*

Be it known that I, J. BARTLETT SMITH, of Winfield, in the county of Herkimer and State of New York, have invented certain new and useful Improvements in Mowing and Harvesting Machines; and I do hereby declare that the following is a full, clear, and exact description of the same, reference being had to the annexed drawings, making a part of this specification, in which—

Figure 1 is a side sectional view of my invention, taken in the line $x\ x$, Fig. 2; Fig. 2, a plan or top view of my invention; Fig. 3, a detached side sectional view of the outermost shoe of the finger-bar, taken in the line $y\ y$, Fig. 2.

Similar letters of reference indicate corresponding parts in the several figures.

To enable those skilled in the art to fully understand and construct my invention, I will proceed to describe it.

A represents the main frame of the machine, B the draft-pole, and C the driving-wheel, the periphery of the latter being provided with projections or ribs $a$ to prevent slipping. D is the driver's seat, which is secured on the main frame; and E is the finger-bar, which is attached to the main frame A by an upright or slightly-inclined bar or plate, F.

To the inner side of the wheel C there is attached a concentric toothed rim, G, into which a pinion, H, gears, said pinion being on a shaft, $a^*$, which is connected by gearing $b^*$ with a shaft, I, on the main frame A.

To the front end of shaft I a crank-pulley, J, is attached, and this crank-pulley has a pitman, K, connected to it, said pitman communicating a reciprocating motion to the sickle L, which is of the usual reciprocating kind.

The pinion H is a sliding one, and may be shifted into and out of gear with rim G when desired.

To the end of main frame A, adjoining the plate F, there are secured two bars, $b\ b$, through the back parts of which an upright bar, M, passes. This bar has a roller, N, at its lower end, and the bar is provided with a shoulder, $c$, at such a point as to retain the finger-bar E a trifle above the surface of the earth.

To the upper end of the bar M there is attached by a fulcrum-pin, $d$, a bent lever, O, the front end of said lever being connected by a link, $e$, with the main frame, and to the latter a spring catch or lever, P, is attached, and placed in such relation with the lever O as to catch over the lower part of the latter as its upper part is forced back and retain the finger-bar in an elevated position, it being understood that as the upper part of lever O is forced back the finger-bar is raised a considerable distance above the surface of the earth to clear obstructions.

The fingers Q, which are attached to the bar E, are of the open kind. These fingers are attached to the under side of the finger-bar, and between the front edge of the latter and the slits $f$ of the former a space or recess, $g$, is formed to receive a bar, R, which has cutters $h$ attached, corresponding in form to the bottoms of the slits $f$, (see Figs. 1 and 2,) the cutters $h$ resting on the bottoms of the slits.

The sickle L may be constructed in the usual way, to wit: a series of V-shaped teeth, $i$, secured side by side to the upper surface of a bar, $j$. The bar $j$ fits behind the bar R of the cutters $h$, and is kept in proper position by guides $k$, and the teeth $i$ of the sickle work over the stationary cutters $h$. By this arrangement it will be seen that the stationary cutters $h$ may be readily ground and kept in proper working order with as little trouble as the teeth of the sickle, for all that is required in order to remove the cutters $h$ is to take out one or more screws which secure the bar R in its recess $g$, and all the cutters $h$ may be removed at once and ground, the same as the teeth of the sickle.

The outer end of the finger-bar E is attached to a shoe, S, and this shoe has an inclined bar, T, attached to it by a screw, $i'$, and to the back part of the shoes S a vertical bar, U, is attached by a screw, $j'$, said bar U having a roller, V, at its lower end.

From the above description it will be seen that both the roller V and bar T may be readily attached to and detached from the shoes S, and that either or both may be used, as circumstances may require. The roller V of course will have a tendency to prevent side draft, and in a majority of cases it would be preferable to use it. In some cases, however, the inclined bar T will be sufficient.

I do not claim the employment or use of stationary cutters secured in the slots or slits of the fingers irrespective of the arrangement herein shown and described; nor do I claim hereby the employment or use of a roller and inclined bar attached to the outermost shoe of the finger-bar; but I do claim as new and desire to secure by Letters Patent—

The arrangement of the removable inclined bar T with the shoe S and roller V, as herein shown and described.

J. BARTLETT SMITH.

Witnesses:
  SAMUEL SMITH,
  S. J. MCKEE.